(12) United States Patent
Edwards

(10) Patent No.: US 11,777,290 B1
(45) Date of Patent: Oct. 3, 2023

(54) PLASTIC GANG BOX WITH METAL THREADED NUT ATTACHMENT

(71) Applicant: Douglas Edwards, Summerville, SC (US)

(72) Inventor: Douglas Edwards, Summerville, SC (US)

( * ) Notice: Subject to any disclaimer, the term of this patent is extended or adjusted under 35 U.S.C. 154(b) by 120 days.

(21) Appl. No.: 17/510,461

(22) Filed: Oct. 26, 2021

(51) Int. Cl.
*H02G 3/08* (2006.01)
*F16B 2/20* (2006.01)

(52) U.S. Cl.
CPC .............. *H02G 3/081* (2013.01); *F16B 2/20* (2013.01)

(58) Field of Classification Search
CPC ............ H02G 3/08; H02G 3/081; H02G 3/12; H02G 3/10; H05K 5/00; H05K 5/02; H01R 13/53
USPC ........................ 174/480, 481, 50, 53, 57, 58; 220/3.2–3.9, 4.02; 248/906
See application file for complete search history.

(56) References Cited

U.S. PATENT DOCUMENTS

| | | | |
|---|---|---|---|
| 3,765,078 A | 10/1973 | Gulistan | |
| 4,012,580 A * | 3/1977 | Arnold | H02G 3/18 174/53 |
| 4,130,335 A * | 12/1978 | Kinney | H02G 3/18 439/535 |
| 4,167,648 A | 9/1979 | Lockwood | |
| 4,219,064 A | 8/1980 | Lozano | |
| 4,281,773 A * | 8/1981 | Mengeu | H02G 3/18 411/176 |
| 4,315,100 A * | 2/1982 | Haslbeck | H02G 3/18 174/53 |
| 4,424,405 A * | 1/1984 | Nattel | H02G 3/18 174/53 |
| 5,907,124 A * | 5/1999 | Reiker | H02G 3/126 220/3.9 |
| 6,291,768 B1 * | 9/2001 | Reiker | E04B 9/006 220/3.9 |
| 6,335,486 B1 | 1/2002 | Reiker | |
| 6,918,725 B2 | 7/2005 | Gauron | |
| 7,342,173 B1 * | 3/2008 | Kidman | H02G 3/083 174/53 |
| 8,729,388 B2 * | 5/2014 | Korcz | H02G 3/18 174/53 |
| 9,048,648 B1 * | 6/2015 | Valentine | H02G 3/14 |
| D778,241 S | 2/2017 | Holbrook | |
| 10,648,499 B2 | 5/2020 | Vovan | |

FOREIGN PATENT DOCUMENTS

WO 2001098033 12/2001

* cited by examiner

*Primary Examiner* — Angel R Estrada
(74) *Attorney, Agent, or Firm* — Kyle A. Fletcher, Esq.

(57) ABSTRACT

The plastic gang box with metal threaded nut attachment is a containment structure. The plastic gang box with metal threaded nut attachment forms a protection space. The protection space contains one or more electrical connections. The plastic gang box with metal threaded nut attachment comprises a gang box, and an insert structure. The gang box is formed from plastic. The insert structure inserts into the gang box. The insert structure is a metal device that is formed with an interior screw thread. The insert structure provides a more durable threaded connection than is available with a traditional plastic gang box.

16 Claims, 7 Drawing Sheets

PLASTIC GANG BOX WITH METAL THREADED NUT ATTACHMENT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of nut cages. (F16B37/044)

SUMMARY OF INVENTION

The plastic gang box with metal threaded nut attachment is a containment structure. The plastic gang box with metal threaded nut attachment forms a protection space. The protection space contains one or more electrical connections. The plastic gang box with metal threaded nut attachment comprises a gang box, and an insert structure. The gang box is formed from plastic. The insert structure inserts into the gang box. The insert structure is a metal device that is formed with an interior screw thread. The insert structure provides a more durable threaded connection than is available with a traditional plastic gang box.

These together with additional objects, features and advantages of the plastic gang box with metal threaded nut attachment will be readily apparent to those of ordinary skill in the art upon reading the following detailed description of the presently preferred, but nonetheless illustrative, embodiments when taken in conjunction with the accompanying drawings.

In this respect, before explaining the current embodiments of the plastic gang box with metal threaded nut attachment in detail, it is to be understood that the plastic gang box with metal threaded nut attachment is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the plastic gang box with metal threaded nut attachment.

It is therefore important that the claims be regarded as including such equivalent construction insofar as they do not depart from the spirit and scope of the plastic gang box with metal threaded nut attachment. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
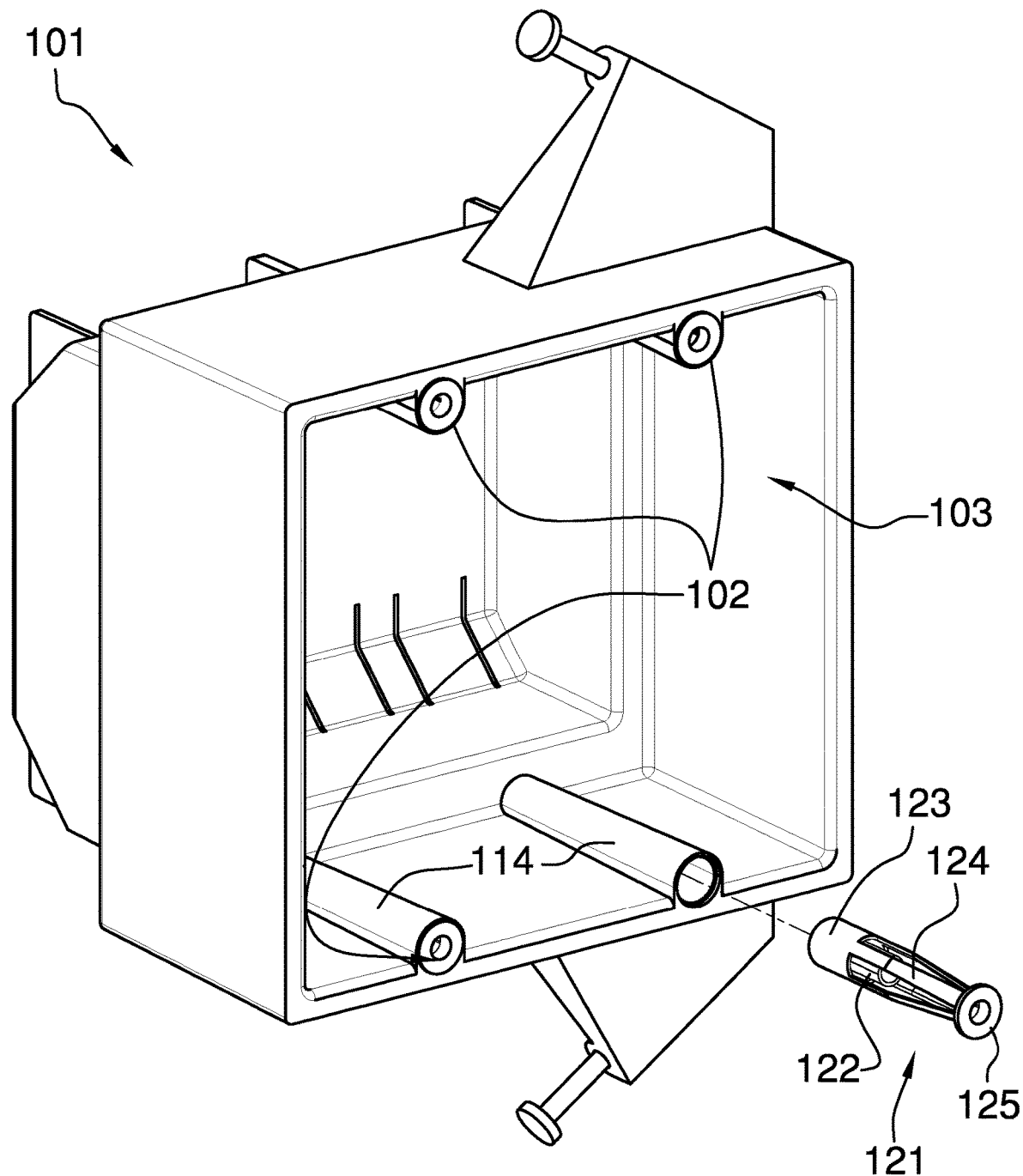
FIG. 1 is a perspective view of an embodiment of the disclosure.
Figure 2:
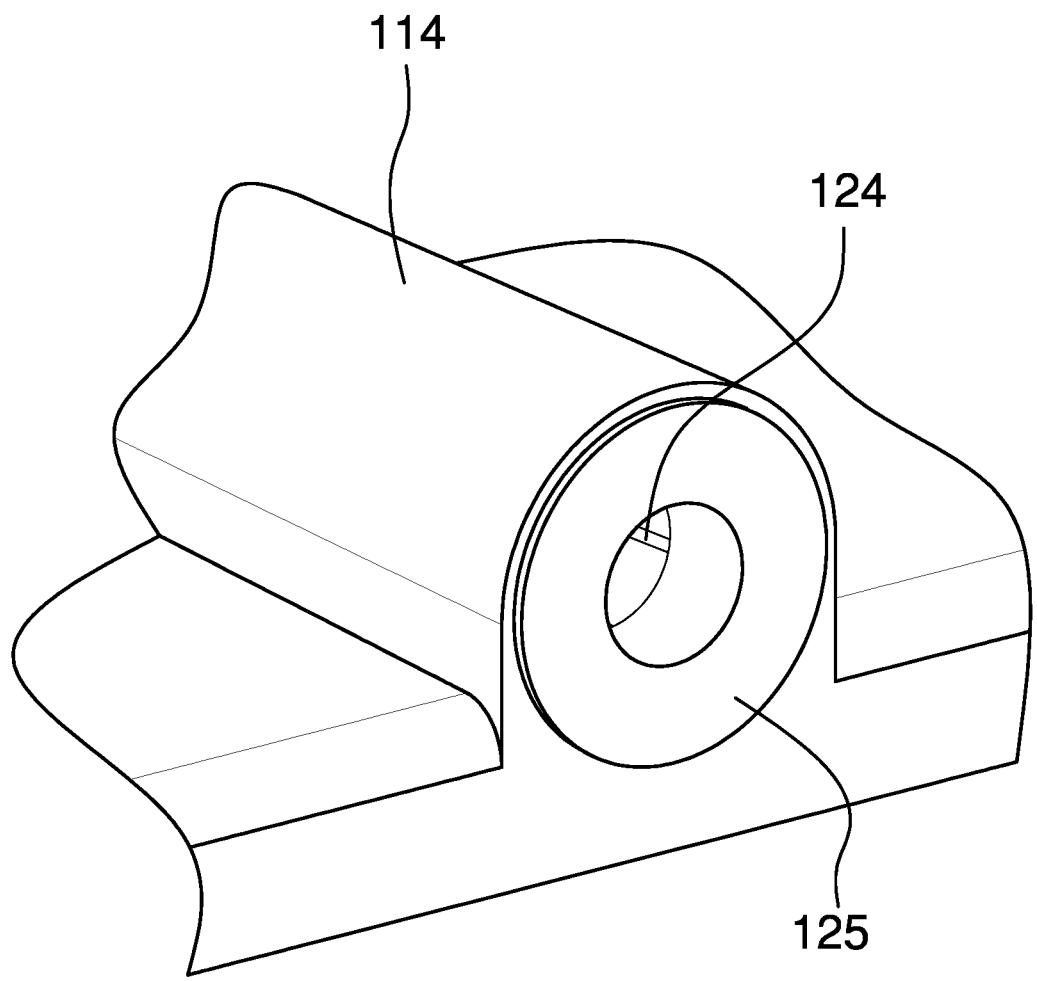
FIG. 2 is a detail view of an embodiment of the disclosure.
Figure 3:
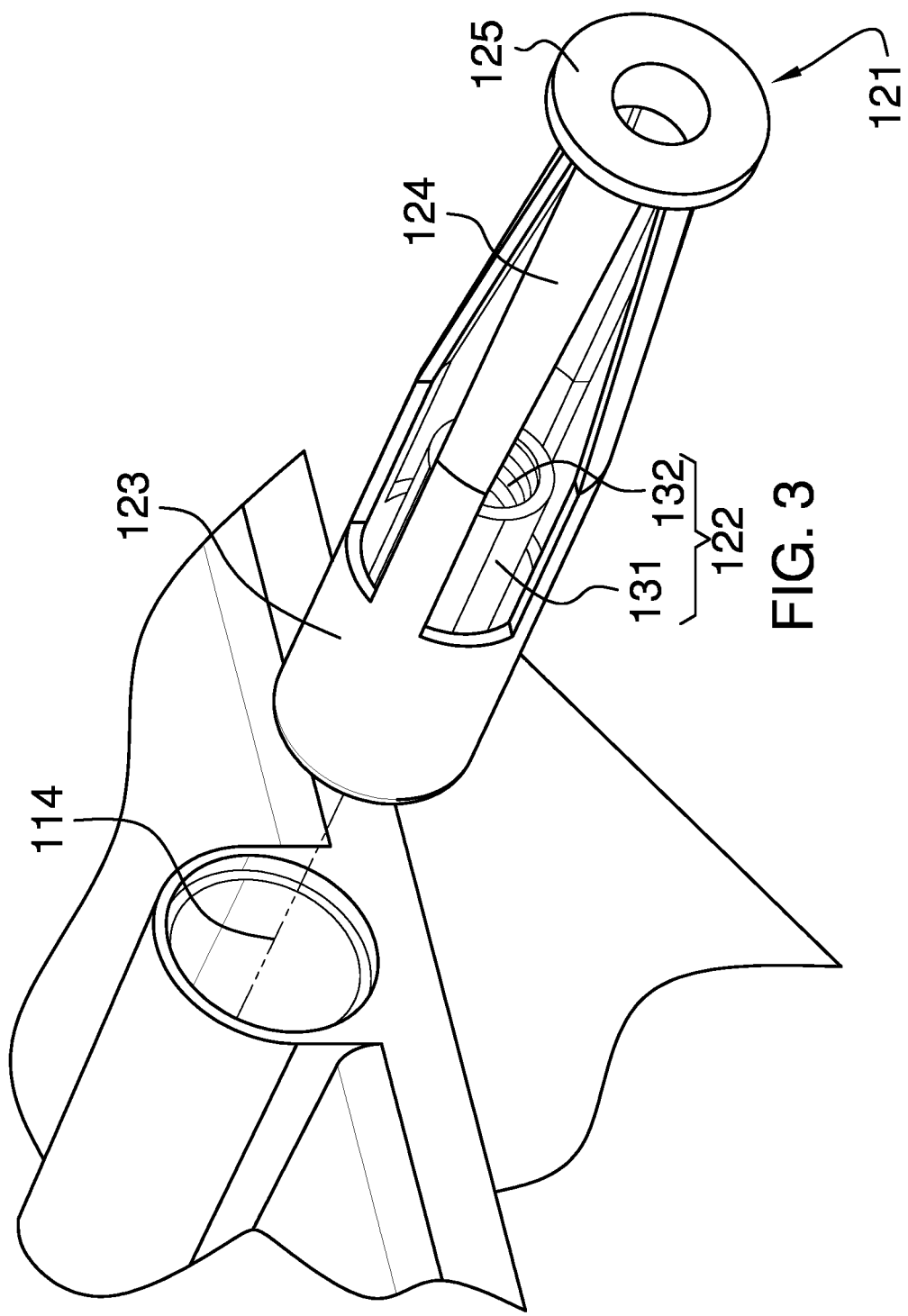
FIG. 3 is an in-use view of an embodiment of the disclosure.
Figure 4:
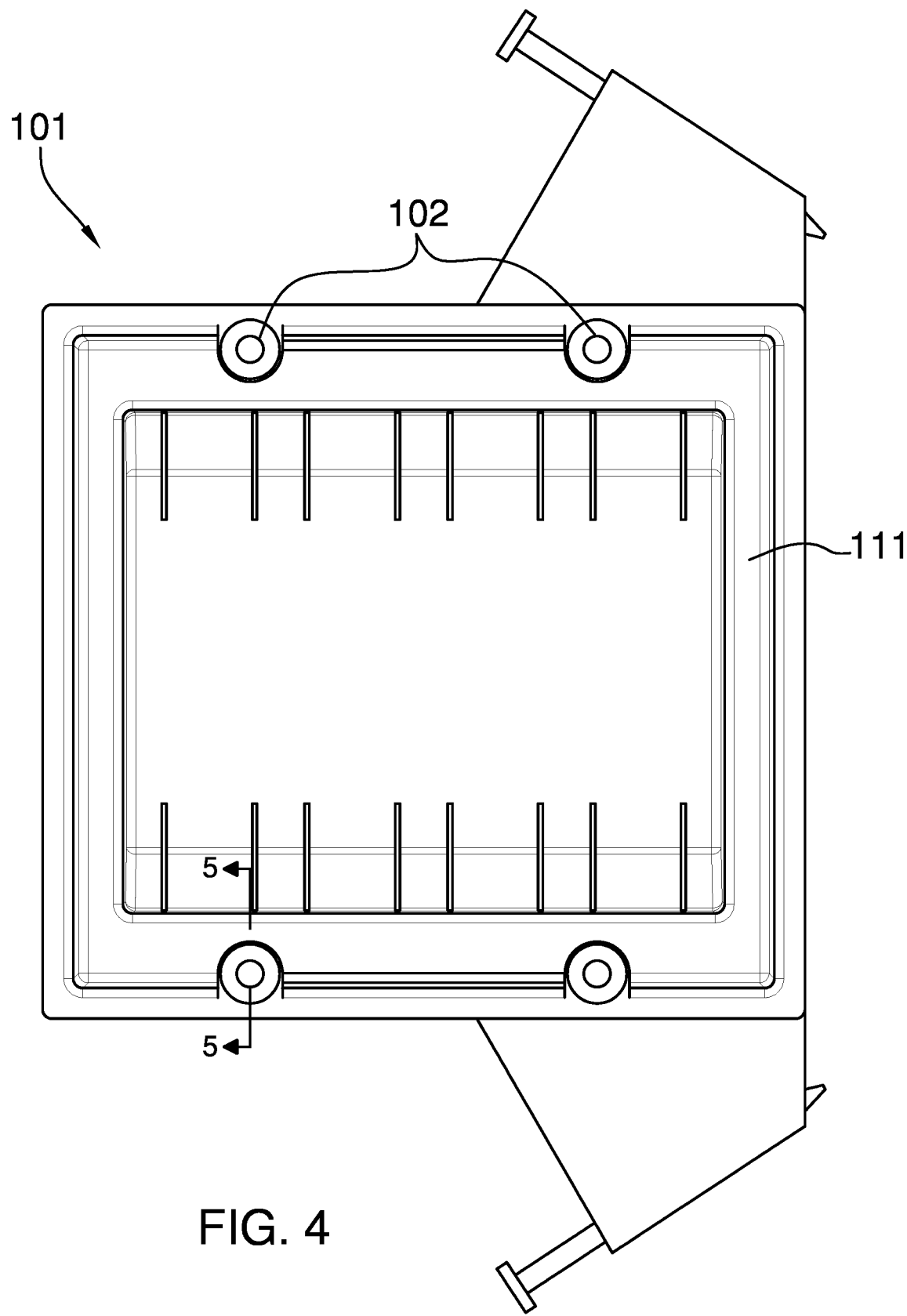
FIG. 4 is a front view of an embodiment of the disclosure.
Figure 5:
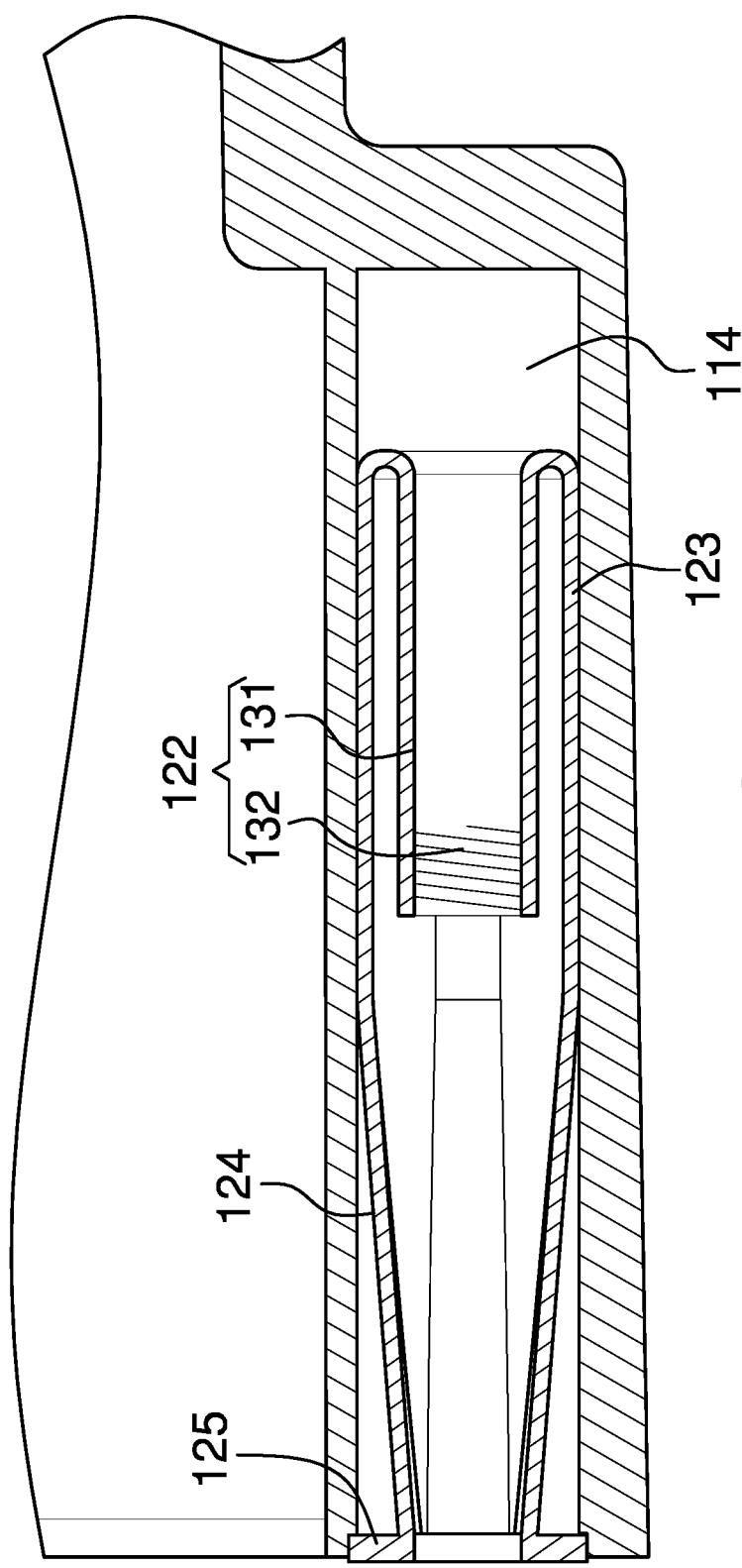
FIG. 5 is a cross-sectional view of an embodiment of the disclosure across 5-5 as shown in FIG. 4.
Figure 6:
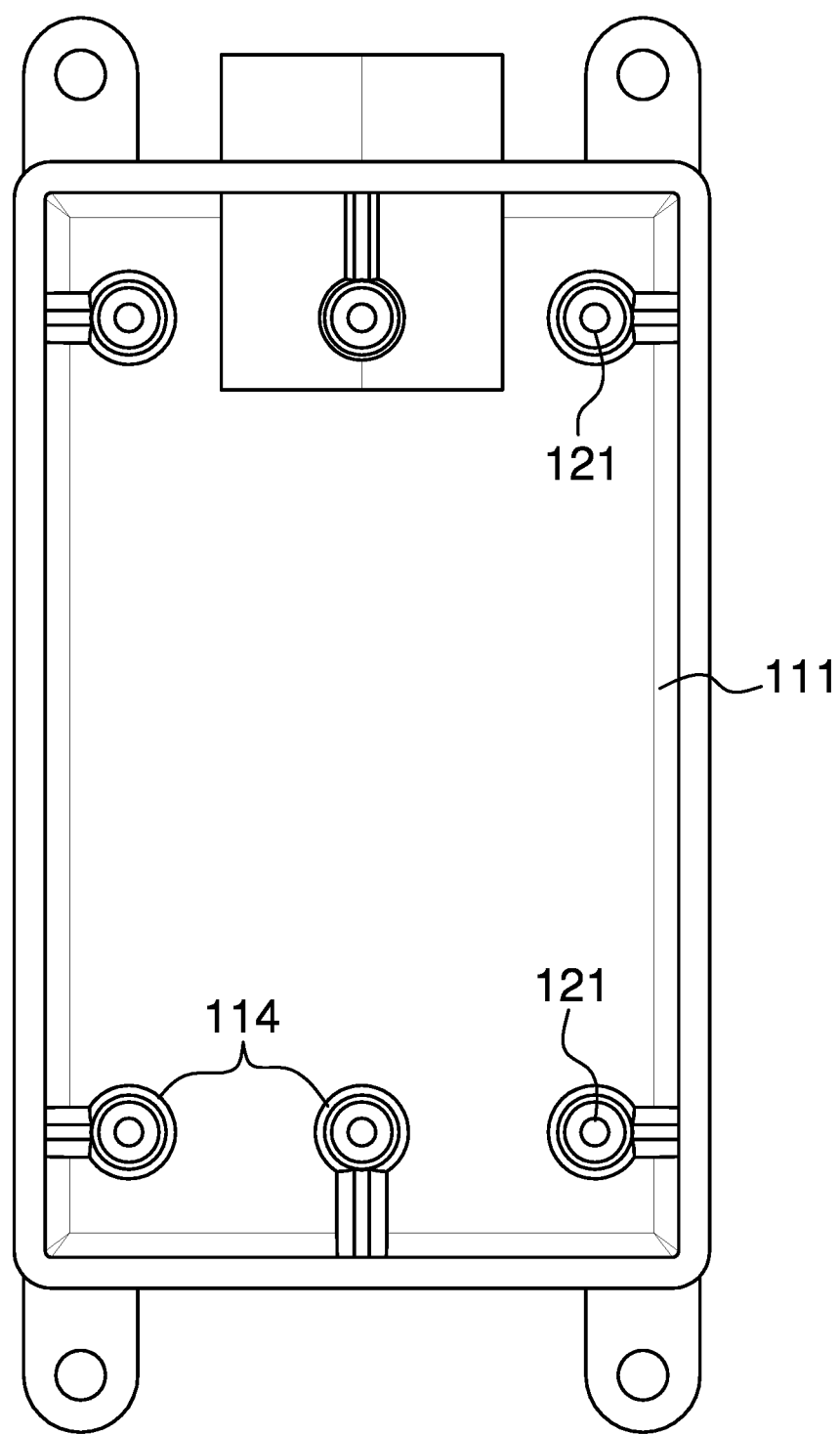
FIG. 6 is a front view of an embodiment of the disclosure.
Figure 7:
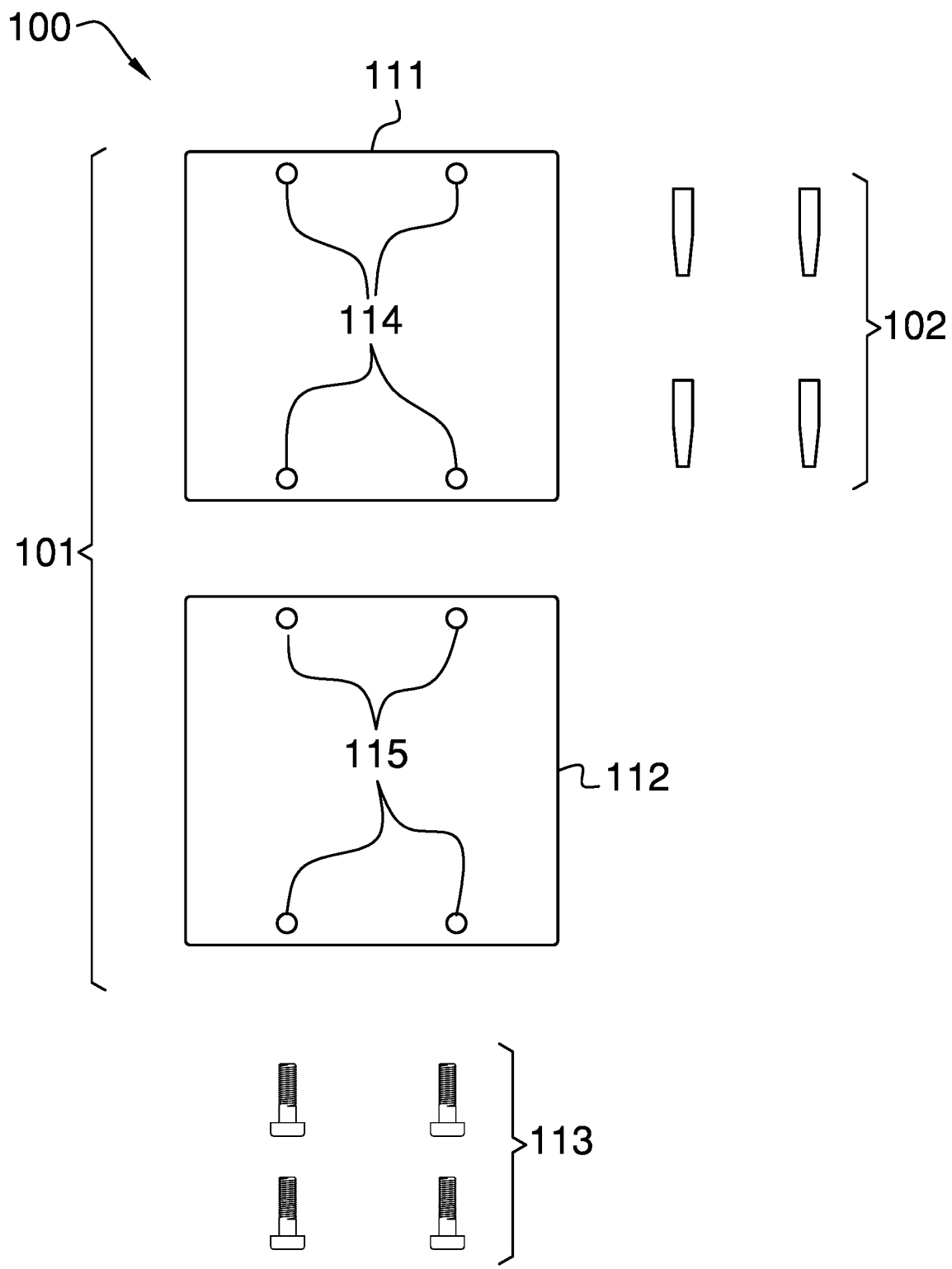
FIG. 7 is an exploded view of an embodiment of the disclosure.

Detailed reference will now be made to one or more potential embodiments of the disclosure, which are illustrated in FIGS. 1 through 7.

The plastic gang box with metal threaded nut attachment 100 (hereinafter invention) is a containment structure. The invention 100 forms a protection space 103. The protection space 103 contains one or more electrical connections. The invention 100 comprises a gang box 101, and a plurality of insert structures 102. The gang box 101 is formed from plastic. The plurality of insert structures 102 insert into the gang box 101. Each of the plurality of insert structures 102 is a metal device that is formed with an interior screw thread. Each of the plurality of insert structures 102 provides a more durable threaded connection than is available with a traditional plastic gang box 101

The gang box 101 forms a protection space 103. The gang box 101 is an enclosable structure. The gang box 101 contains one or more electrical connections within the protection space 103. The primary shape of the gang box 101 is a prism shaped structure. The gang box 101 is formed from a plastic material. The protection space 103 is an enclosed space formed by the invention 100. The protection space 103 isolates the one or more electrical power connections from the exterior of the invention 100. The protection space 103 is defined elsewhere in this disclosure. Each of the plurality of insert structures 102 is a metal structure. The gang box 101 comprises a pan structure 111, a face plate 112, and a protection space 103.

The pan structure 111 is a prism shaped structure. The pan structure 111 is a rigid structure. The pan structure 111 is formed in the shape of a pan. The pan structure 111 forms the containment space of the protection space 103 formed by the gang box 101. The pan structure 111 is an enclosable structure. The pan structure 111 forms the primary shape of the gang box 101. The pan structure 111 further comprises a plurality of mounting nuts 114.

Each of the plurality of mounting nuts 114 is a nut formed in the containment space formed by the pan structure 111. The nut is defined elsewhere in this disclosure. Each of the plurality of mounting nuts 114 is formed with an interior screw thread. Each mounting nut selected from the plurality of mounting nuts 114 is sized such that a bolt selected from the plurality of bolts 113 will screw into the selected mounting nut to form a threaded connection. Each mounting nut selected from the plurality of mounting nuts 114 is sized such that an individual insert structure 121 selected from the plurality of insert structures 102 will insert in the hollow interior of the selected mounting nut.

The face plate 112 is a disk shaped structure. The face plate 112 is a rigid structure. The face plate 112 is geometrically similar to the open face of the pan structure 111. The face plate 112 forms the structure that encloses the protection space 103 formed by the pan structure 111. The face plate 112 further comprises a plurality of clean nuts 115.

Each clean nut selected from the plurality of clean nuts 115 is a negative space that is formed through the faces of the disk structure of the face plate 112. The clean nut is defined elsewhere in this disclosure. Each clean nut selected from the plurality of clean nuts 115 is positioned on the face plate 112 such that the center axis of the selected clean nut will align with the center axis of a mounting nut selected from the plurality of mounting nuts 114. Each clean nut selected from the plurality of clean nuts 115 is sized such that each bolt selected from the plurality of bolts 113 inserts through the selected clean nut to secure the face plate 112 to the pan structure 111.

Each of the plurality of bolts 113 is a fastening device. The bolt is defined elsewhere in this disclosure. Each of the plurality of bolts 113 is sized to form a threaded connection with any mounting nut selected from the plurality of mounting nuts 114. Each of the plurality of bolts 113 is sized to form a threaded connection with any individual insert structure 121 selected from the plurality of insert structures 102. Each of the plurality of bolts 113 inserts through a clean nut selected from the plurality of clean nuts 115 in order to screw into a structure selected from the group consisting of a mounting nut selected from the plurality of mounting nuts 114 and an individual insert structure 121 selected from the plurality of insert structures 102.

Each of the plurality of insert structures 102 forms a roughly prism shaped structure. Each of the plurality of insert structures 102 is identical. There is a one to one correspondence between the plurality of insert structures 102 and the plurality of mounting nuts 114. The plurality of insert structures 102 comprises a collection of individual insert structures 121.

Each individual insert structure 121 is an insert structure selected from the plurality of insert structures 102. Each individual insert structure 121 selected from the plurality of insert structures 102 is identical. Each selected individual insert structure 121 is associated with a mounting nut selected from the plurality of mounting nuts 114. Each individual insert structure 121 inserts into the hollow interior of the associated mounting nut to form a composite prism structure.

Each individual insert structure 121 selected from the plurality of insert structures 102 is formed with a base interior screw thread 132. Each base interior screw thread 132 is formed within the metal structure of its associated individual insert structure 121. The metal construction of the base interior screw thread 132 of the individual insert structure 121 forms a more reliable threaded connection with the bolt selected from the plurality of bolts 113 that is designated to screw into the mounting nut selected from the plurality of mounting nuts 114 that is associated with the individual insert structure 121.

Each bolt selected from the plurality of bolts 113 is sized such that the selected bolt can screw into any individual insert structure 121 selected from the plurality of insert structures 102 after the selected individual insert structure 121 inserts into the associated mounting nut. Each selected individual insert structure 121 inserts into the hollow interior of the associated mounting nut such that the individual insert structure 121 is permanently anchored within its associated mounting nut. Each selected individual insert structure 121 presents to the bolt selected from the plurality of bolts 113 to screw into the selected individual insert structure 121 a base interior screw thread 132 that allows the selected bolt to form a threaded connection with the selected individual insert structure 121.

Each individual insert structure 121 comprises a base nut 122, an outer shell 123, an extension taper 124, and a stop ring 125.

The base nut 122 is a hollow prism shaped structure. The base nut 122 has a tubular shape. The base nut 122 forms a nut that is sized to receive a bolt selected from the plurality of bolts 113. The selected bolt screws into the base nut 122 to form a threaded connection that secures the face plate 112 to the pan structure 111. Each base nut 122 further comprises a base cylinder 131 and the base interior screw thread 132.

The base cylinder 131 is a prism shaped structure. The base cylinder 131 is a hollow structure. The base cylinder 131 has a tubular shape. The base cylinder 131 forms the primary shape of the base nut 122. The base cylinder 131 forms the exterior surfaces of the base nut 122. The base cylinder 131 mounts in the outer shell 123 such that the center axes of the base cylinder 131, the outer shell 123, the extension taper 124, and the stop ring 125 are aligned. The inner dimension of the tubular structure of the base cylinder 131 is sized to receive any bolt selected from the plurality of bolts 113.

The base interior screw thread 132 is an interior screw thread that is formed on the lateral face of the hollow interior of the base cylinder 131. The base interior screw thread 132 is sized to receive any bolt selected from the plurality of bolts 113. The selected bolt screws into the base interior screw thread 132 for form a threaded connection that secures the face plate 112 to the pan structure 111.

The outer shell 123 is a rigid structure. The outer shell 123 forms a tubular structure. The outer shell 123 contains the base nut 122. The base nut 122 installs into the hollow interior of the outer shell 123 to form a composite prism structure. The outer shell 123 secures the base nut 122 into a fixed position relative to the outer shell 123, the extension taper 124, the stop ring 125, and the clean nut associated with the mounting structure associated with the individual insert structure 121. The outer shell 123 ensures the alignment of the center axes of the base nut 122, the extension taper 124, the stop ring 125, and the clean nut associated with the mounting structure associated with the individual insert structure 121. The outer shell 123 is formed with all apertures and form factors necessary to allow the outer shell 123 to accommodate the use and operation of the base nut 122. Methods to form an outer shell 123 suitable for the purposes described in this disclosure are well-known and documented in the mechanical arts.

The extension taper 124 is a prism shaped structure. The extension taper 124 is formed as a tapered prism. The extension taper 124 is formed as a semi-enclosed prism. The extension taper 124 attaches the outer shell 123 to the stop ring 125 such that the center axes of the base nut 122, the extension taper 124, and the stop ring 125 are aligned. The extension taper 124 forms an extension structure that extends the reach between the base nut 122 and the stop ring 125. By extending the reach between the base nut 122 and the stop ring 125, the extension taper 124 ensures that the base nut 122 is deeply anchored within the mounting nut associated with the individual insert structure 121.

The stop ring 125 is a disk shaped structure. The stop ring 125 is formed as a ring. The inner dimension of the negative space characteristic of the ring structure of the stop ring 125 is sized such that any bolt selected from the plurality of bolts 113 inserts through the stop ring 125. The stop ring 125 forms a stop that prevents the associated individual insert structure 121 from being inserted too deeply into the mounting nut associated with the individual insert structure 121.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Bolt: As used in this disclosure, a bolt is a cylindrical shaft that is formed with an exterior screw thread. A bolt is defined with an outer diameter.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Clean Nut: As used in this disclosure, a clean nut is a prism shaped negative space that is formed through the faces of a prism-shaped disk structure. The negative space that forms the clean nut forms a disk-shaped structure that allows a shaft to be inserted through the faces of the disk. The use of the term clean nut indicates that an interior screw thread is not formed on the lateral face of the clean nut. The clean nut is further defined with an inner dimension.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Copolymer: As used in this disclosure, a copolymer is a polymer formed from two or more repeating molecules (also referred to as monomers).

Correspond: As used in this disclosure, the term correspond is used as a comparison between two or more objects wherein one or more properties shared by the two or more objects match, agree, or align within acceptable manufacturing tolerances.

Diameter: As used in this disclosure, a diameter of an object is a straight line segment (or a radial line) that passes through the center (or center axis) of an object. The line segment of the diameter is terminated at the perimeter or boundary of the object through which the line segment of the diameter runs. A radius refers to the line segment that overlays a diameter with one termination at the center of the object. A span of a radius is always one half the span of the diameter. Include Radial Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Extension Structure: As used in this disclosure, an extension structure is an inert physical structure that is used to extend or bridge the reach between any two objects.

Exterior: As used in this disclosure, the exterior is used as a relational term that implies that an object is not contained within the boundary of a structure or a space.

Exterior Screw Thread: An exterior screw thread is a ridge wrapped around the outer surface of a tube in the form of a helical structure that is used to convert rotational movement into linear movement.

Faceplate: As used in this disclosure, a faceplate is a plate structure that is mounted on a surface that encloses a potentially dangerous electrical or mechanical structure. A faceplate is often formed with apertures that allow for access to interface components of the electrical or mechanical structure. Commonly used faceplates with such apertures include, but are not limited to, a faceplate that encloses an electrical port used for power distribution and a faceplate that encloses an electrical switch used for turning on or off a light.

Helix: As used in this disclosure, a helix is the three-dimensional structure that would be formed by a wire that is wound uniformly around the surface of a cylinder or a cone. If the wire is wrapped around a cylinder the helix is called a cylindrical helix. If the wire is wrapped around a cone, the helix is called a conical helix. A synonym for conical helix would be a volute.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Inner Dimension: As used in this disclosure, the term inner dimension describes the span from a first inside or interior surface of a container to a second inside or interior surface of a container. The term is used in much the same way that a plumber would refer to the inner diameter of a pipe.

Interior: As used in this disclosure, the interior is used as a relational term that implies that an object is contained within the boundary of a structure or a space.

Interior Screw Thread: An interior screw thread is a groove that is formed around the inner surface of a tube in the form of a helical structure that is used to convert rotational movement into linear movement.

Loop: As used in this disclosure, a loop is the length of a first linear structure including, but not limited to, shafts, lines, cords, or webbings, that is: 1) folded over and joined at the ends forming an enclosed space; or, 2) curved to form a closed or nearly closed space within the first linear structure. In both cases, the space formed within the first linear structure is such that a second linear structure such as a line, cord or a hook can be inserted through the space formed within the first linear structure. Within this disclosure, the first linear structure is said to be looped around the second linear structure.

Major and Minor Axes: As used in this disclosure, the major and minor axes refer to a pair of perpendicular axes that are defined within a structure. The length of the major axis is always greater than or equal to the length of the minor axis. The major axis is always the longest diameter of the of the perimetrical boundary of the structure. The major and minor axes intersect at the center of the perimetrical boundary of the structure. The major axis is always parallel to the longest edge of a rectangular structure.

Metal: As used in this disclosure, a metal is an element that readily loses electrons or an alloy formed from a plurality of such elements. General properties of metals include, but are not limited to, the ability to conduct heat, conduct electricity, malleability, and the ability to be drawn into a wire. For the purposes of this disclosure, the term metal is assumed to include the transition metals (columns 3-12 of the periodic table) and aluminum, tin, and lead. The alkali metals (column 1 of the periodic table) and the alkali earth metals (column 2 of the periodic table) are assumed to be excluded from this definition. In this disclosure, the preferred metals of choice are aluminum, zinc, iron, and iron based mixtures of metals commonly referred to as steel.

Monomer: As used in this disclosure, a monomer refers to a molecular structure that bonds to itself in a repeating manner to form a polymer.

Negative Space: As used in this disclosure, negative space is a method of defining an object through the use of open or empty space as the definition of the object itself, or, through the use of open or empty space to describe the boundaries of an object.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

Nut: As used in this disclosure, a nut is a first object that is formed with a prism shaped (cylindrical) negative space that further comprises an interior screw thread such that a second object with a matching exterior screw thread can screwed into the first object forming a threaded connection. A nut is further defined with an inner diameter.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Organic: As used in this disclosure, organic refers to a carbon-based chemical structure. A limited number of carbon-based salts are traditionally considered inorganic chemical structures and are excluded from the study of organic chemistry.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Perimeter: As used in this disclosure, a perimeter is one or more curved or straight lines that bounds an enclosed area on a plane or surface. The perimeter of a circle is commonly referred to as a circumference.

Plastic: As used in this disclosure, plastic refers to a manufactured material that is formed from a structure selected from the group consisting of a polymer or a copolymer. Unless stated otherwise, this disclosure assumes that the plastic is formed from organic monomers.

Polymer: As used in this disclosure, a polymer refers to a molecular chain that comprises multiple repeating units known as monomers. The repeating unit may be an atom or a molecular structure.

Primary Shape: As used in this disclosure, the primary shape refers to a description of the overall geometric shape of an object that is assembled from multiple components.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protection Space: As used in this disclosure, a protection space is a space formed by a boundary structure. The boundary structure forms a protective barrier that protects objects outside the protection space from potential dangers from the operation of a device or process contained within the protection space.

Protective Barrier: As used in this disclosure, a protected barrier is a boundary structure. The boundary structure forms a barrier that separates a first object from a second object such that the second object cannot damage the first object.

Radial: As used in this disclosure, the term radial refers to a direction that: 1) is perpendicular to an identified central axis; or, 2) projects away from a center point.

Reach: As used in this disclosure, reach refers to a span of distance between any two objects.

Rigid Structure: As used in this disclosure, a rigid structure is a solid structure formed from an inelastic material that resists changes in shape. A rigid structure will permanently deform as it fails under a force. See bimodal flexible structure.

Ring: As used in this disclosure, a ring is term that is used to describe a disk-like structure through which a negative space is formed through the faces of the disk-like structure. Rings are often considered loops.

Roughly: As used in this disclosure, roughly refers to a comparison between two objects. Roughly means that the difference between one or more parameters of the two compared objects are not significantly different.

Screw: As used in this disclosure, to screw is a verb meaning: 1) to fasten or unfasten (unscrew) a threaded connection; or 2) to attach a helical structure to a solid structure.

Semi-Enclosed Prism: As used in this disclosure, a semi-enclosed prism is a prism-shaped structure wherein a portion of the lateral face of the prism-shaped is removed or otherwise replaced with a negative space. negative space.

Shell: As used in this disclosure, a shell is a structure that forms an outer covering intended to contain an object. Shells are often, but not necessarily, rigid, or semi-rigid structures that are intended to protect the object contained within it.

Stop: As used in this disclosure, a stop is a mechanical structure that blocks the motion of an object along a track. The stop is used to limit the range of motion of the object. The stop can also be configured apply a force that can be used to push an object along a track.

Such As: As used in this disclosure, the term "such as" is a conjunction that relates a first phrase to a subsequent phrase. The term "such as" is used to introduce representative examples of structures that meet the requirements of the first phrase. As a first example of the use of the term "such as," the phrase: "the first textile attaches to the second textile using a fastener such as a hook and loop fastener" is taken to mean that a hook and loop fastener is suitable to use as the fastener but is not meant to exclude the use of a zipper or a sewn seam. As a second example of the use of the term "such as," the phrase: "the chemical substance is a halogen such as chlorine or bromine" is taken to mean that either chlorine or bromine are suitable for use as the halogen but is not meant to exclude the use of fluorine or iodine.

Such That: As used in this disclosure, the term "such that" is a conjunction that relates a first phrase to a subsequent phrase. The term "such that" is used to place a further limitation or requirement to the first phrase. As a first example of the use of the term "such that," the phrase: "the door attaches to the wall such that the door rotates relative to the wall" requires that the attachment of the door allows for this rotation. As a second example of the use of the term "such that," the phrase: "the chemical substance is selected such that the chemical substance is soluble in water" requires that the selected chemical substance is soluble in water. As a third example of the use of the term "such that," the phrase: "the lamp circuit is constructed such that the lamp circuit illuminates when the lamp circuit detects darkness" requires that the lamp circuit: a) detect the darkness; and, b) generate the illumination when the darkness is detected.

Taper: As used in this disclosure, a taper is a continuous and typically, but not necessarily gradual, change in the span of the length of a structure in the direction parallel a direction selected from the group selected from the major axis and the minor axis of the structure. The change in the span of the length occurs as an apparent function of the measurement position along the unselected axis of the object.

Tapered Prism Structure: As used in this disclosure, a tapered prism structure is a modified prism structure that is formed such that the first congruent end of the modified prism structure is geometrically similar to, but not geometrically identical to the second congruent end of the modified prism. The span of length of a radial line from the center axis to the lateral face of the modified prism structure will vary as a function of its position along the center axis.

Threaded Connection: As used in this disclosure, a threaded connection is a type of fastener that is used to join a first cylindrical object and a second cylindrical object together. The first cylindrical object is fitted with a first fitting selected from an interior screw thread or an exterior screw thread. The second cylindrical object is fitted with the remaining screw thread. The cylindrical object fitted with the exterior screw thread is placed into the remaining cylindrical object such that: 1) the interior screw thread and the exterior screw thread interconnect; and, 2) when the cylindrical object fitted with the exterior screw thread is rotated the rotational motion is converted into linear motion that moves the cylindrical object fitted with the exterior screw thread either into or out of the remaining cylindrical object. The direction of linear motion is determined by the direction of rotation.

Tradition: As used in this disclosure, a tradition refers to: 1) a set of thoughts or expectations regarding a subject or object; or, 2) a method of using an object; that, 3) is perceived to be widely or commonly shared across a population of people; and that, 4) is perceived to be widely or commonly shared across at least two generations within the population of people.

Tube: As used in this disclosure, the term tube is used to describe a hollow prism-shaped device with two congruent open ends. While tubes that are suitable for use in this disclosure are often used to transport or conveys fluids or gases, the purpose of the tubes in this disclosure are structural. In this disclosure, the terms inner dimension and outer dimension of a tube are used as they would be used by those skilled in the plumbing arts.

With respect to the above description, it is to be realized that the optimum dimensional relationship for the various components of the invention described above and in FIGS. 1 through 7 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A plastic gang box with metal threaded nut attachment comprising
   a gang box, and a plurality of insert structures;
   wherein the plurality of insert structures insert into the gang box;
   wherein the gang box is formed from a plastic material;
   wherein each of the plurality of insert structures is a metal device;
   wherein each individual insert structure selected from the plurality of insert structures is formed with a base interior screw thread;
   wherein each individual insert structure comprises a base nut, an outer shell, an extension taper, and a stop ring;
   wherein the base nut mounts in the outer shell;
   wherein the extension taper attaches the stop ring to the outer shell.

2. The plastic gang box with metal threaded nut attachment according to claim 1
   wherein the plastic gang box with metal threaded nut attachment forms a protection space;
   wherein the protection space contains one or more electrical connections.

3. The plastic gang box with metal threaded nut attachment according to claim 2
   wherein the gang box forms a protection space;
   wherein the gang box is an enclosable structure;
   wherein the gang box contains one or more electrical connections within the protection space.

4. The plastic gang box with metal threaded nut attachment according to claim 3
   wherein the protection space is an enclosed space formed by the plastic gang box with metal threaded nut attachment;
   wherein the protection space isolates the one or more electrical power connections from the exterior of the plastic gang box with metal threaded nut attachment.

5. The plastic gang box with metal threaded nut attachment according to claim 4
   wherein each of the plurality of insert structures is identical;
   wherein there is a one to one correspondence between the plurality of insert structures and the plurality of mounting nuts;
   wherein the plurality of insert structures comprises a collection of individual insert structures;
   wherein each individual insert structure is an insert structure selected from the plurality of insert structures;
   wherein each individual insert structure selected from the plurality of insert structures is identical.

6. The plastic gang box with metal threaded nut attachment according to claim 5
   wherein each base interior screw thread is formed within the metal structure of its associated individual insert structure;
   wherein each bolt selected from the plurality of bolts is sized such that the selected bolt can screw into any individual insert structure selected from the plurality of insert structures after the selected individual insert structure inserts into the associated mounting nut;
   wherein each selected individual insert structure inserts into the hollow interior of the associated mounting nut such that the individual insert structure is permanently anchored within its associated mounting nut;
   wherein each selected individual insert structure presents to the bolt selected from the plurality of bolts to screw into the selected individual insert structure a base interior screw thread that allows the selected bolt to form a threaded connection with the selected individual insert structure.

7. The plastic gang box with metal threaded nut attachment according to claim 6
   wherein the gang box comprises a pan structure, a face plate, a plurality of bolts, and a protection space;
   wherein the plurality of bolts attach face plate to the pan structure to form the protection space.

8. The plastic gang box with metal threaded nut attachment according to claim 7
   wherein the pan structure is a rigid structure;
   wherein the pan structure is formed in the shape of a pan;
   wherein the pan structure forms the containment space of the protection space formed by the gang box;
   wherein the pan structure is an enclosable structure;
   wherein the pan structure forms the primary shape of the gang box.

9. The plastic gang box with metal threaded nut attachment according to claim
   wherein the face plate is a disk shaped structure;
   wherein the face plate is a rigid structure;
   wherein the face plate is geometrically similar to the open face of the pan structure;
   wherein the face plate forms the structure that encloses the protection space formed by the pan structure.

10. The plastic gang box with metal threaded nut attachment according to claim 9
    wherein each of the plurality of bolts is a fastening device;
    wherein each of the plurality of bolts is sized to form a threaded connection with any mounting nut selected from the plurality of mounting nuts;
    wherein each of the plurality of bolts is sized to form a threaded connection with any individual insert structure selected from the plurality of insert structures;
    wherein each of the plurality of bolts inserts through a clean nut selected from the plurality of clean nuts in order to screw into a structure selected from the group consisting of a mounting nut selected from the plurality of mounting nuts and an individual insert structure selected from the plurality of insert structures.

11. The plastic gang box with metal threaded nut attachment according to claim 10
    wherein the pan structure further comprises a plurality of mounting nuts;

wherein each of the plurality of mounting nuts is a nut formed in the containment space formed by the pan structure;

wherein each of the plurality of mounting nuts is formed with an interior screw thread;

wherein each mounting nut selected from the plurality of mounting nuts is sized such that a bolt selected from the plurality of bolts will screw into the selected mounting nut to form a threaded connection;

wherein each mounting nut selected from the plurality of mounting nuts is sized such that an individual insert structure selected from the plurality of insert structures will insert in the hollow interior of the selected mounting nut;

wherein the face plate further comprises a plurality of clean nuts;

wherein each clean nut selected from the plurality of clean nuts is a negative space that is formed through the faces of the disk structure of the face plate;

wherein each clean nut selected from the plurality of clean nuts is positioned on the face plate such that the center axis of the selected clean nut will align with the center axis of a mounting nut selected from the plurality of mounting nuts;

wherein each clean nut selected from the plurality of clean nuts is sized such that each bolt selected from the plurality of bolts inserts through the selected clean nut to secure the face plate to the pan structure.

12. The plastic gang box with metal threaded nut attachment according to claim 11 wherein each selected individual insert structure is associated with a mounting nut selected from the plurality of mounting nuts;

wherein each individual insert structure inserts into the hollow interior of the associated mounting nut to form a composite structure.

13. The plastic gang box with metal threaded nut attachment according to claim 12 wherein the base nut is a hollow structure;

wherein the base nut has a tubular shape;

wherein the base nut forms a nut that is sized to receive a bolt selected from the plurality of bolts;

wherein the selected bolt screws into the base nut to form a threaded connection that secures the face plate to the pan structure.

14. The plastic gang box with metal threaded nut attachment according to claim 13 wherein each base nut further comprises a base cylinder and the base interior screw thread;

wherein the base cylinder is a hollow structure;

wherein the base cylinder has a tubular shape;

wherein the base cylinder forms the primary shape of the base nut;

wherein the base cylinder forms the exterior surfaces of the base nut;

wherein the base cylinder mounts in the outer shell such that the center axes of the base cylinder, the outer shell, the extension taper, and the stop ring are aligned;

wherein the inner dimension of the tubular structure of the base cylinder is sized to receive any bolt selected from the plurality of bolts;

wherein the base interior screw thread is an interior screw thread that is formed on the lateral face of the hollow interior of the base cylinder;

wherein the base interior screw thread is sized to receive any bolt selected from the plurality of bolts;

wherein the selected bolt screws into the base interior screw thread for form a threaded connection that secures the face plate to the pan structure.

15. The plastic gang box with metal threaded nut attachment according to claim 14 wherein the outer shell is a rigid structure;

wherein the outer shell forms a tubular structure;

wherein the outer shell contains the base nut;

wherein the base nut installs into the hollow interior of the outer shell to form a composite structure;

wherein the outer shell secures the base nut into a fixed position relative to the outer shell, the extension taper, the stop ring, and the clean nut associated with the mounting structure associated with the individual insert structure;

wherein the outer shell ensures the alignment of the center axes of the base nut, the extension taper, the stop ring, and the clean nut associated with the mounting structure associated with the individual insert structure.

16. The plastic gang box with metal threaded nut attachment according to claim 15 wherein the extension taper is a tapered structure;

wherein the extension taper is formed as a semi-enclosed structure;

wherein the extension taper attaches the outer shell to the stop ring such that the center axes of the base nut, the extension taper, and the stop ring are aligned;

wherein the extension taper forms an extension structure that extends the reach between the base nut and the stop ring;

wherein the stop ring is a disk shaped structure;

wherein the stop ring is formed as a ring;

wherein the inner dimension of the negative space characteristic of the ring structure of the stop ring is sized such that any bolt selected from the plurality of bolts inserts through the stop ring;

wherein the stop ring forms a stop that prevents the associated individual insert structure from being inserted too deeply into the mounting nut associated with the individual insert structure.

\* \* \* \* \*